(12) United States Patent
Edgar et al.

(10) Patent No.: X9533
(45) Date of Patent: Mar. 23, 1836

(54) THRASHING MACHINE

(76) Inventors: Hugh Edgar; Isaac W. Edgar

Hugh Edgar (and) Isaac W. Edgar
Wayne Co. Ohio
Letters Patent.

The schedule referred to in these Letters Patent and making part of the same containing a description in the words of the said Hugh Edgar and Isaac W. Edgar themselves of their improvement in the Spike Thrashing machine To all to whom these presents shall come: Be it known that We Hugh and Isaac W. Edgar of the County of Wayne and State of Ohio have invented a new and useful improvement in Spike Thrashing Machines and that the following is a full and exact description of the construction of the said Machine as improved by us. The machine is constructed in the following manner - Viz - The frame consists of 4 posts about 4 inches square and 2 side girts 13 inches wide and 2 ins thick - the side girts are framed into the inside of the posts 18 ins from the Bottom and secured to them with screw bolts passing through both. the front posts stand at right angles with the side girts - the lower ends of the back posts are inclined backwards to an angle of about 20 degrees from the parallel of the front posts. the posts are 19 ins apart at the top of the side girts 4 ins in width of the upper edge of the side girts is 3 feet 6 ins long projecting 8 ins in front & the same distance back of the posts. the lower part of the girts extend 2 ins on the outside of the posts and are cut parallel with them. a cap is framed across on the top of the front posts immediately above the side girts. the back posts extend about 8 ins above the side girts with a cap framed across on the top of them. two cross girts 2 by 4 ins in size are framed into the back and front of the frame near the bottom of the posts. the frame made 2 feet 6 ins in the clear between the side girts – The concave consists of 2 pieces 2 feet 6 ins long and 2&½ ins
thick. the lower piece 5 ins wide on the upper side which is made
concave and forms an arc of a circle the radius of which is 9¾
ins. the concave part of the upper piece is of the same dimentions and
shape as the lower piece the back part is made wide enough to extend
nearly to the back of the frame. it is made the proper slope and
used as part of the feed Apron, the concave commences immediately
under the centre of the Cylinder and extends towards the back of the
frame. the concave is supported at each end in a rabbet formed on
the inside of the side girts. by cutting inch Board to fit the upper
and under sides of the concave and making them fast to the side
girts. the concave contains about 48 Spikes made and placed in
the following manner. that part of the spikes which extends above
the surface of the concave is 1¾/2 ins long ⅝ of an inch square
at the surface of the wood and ¼ of an inch square at the point.
sloping them equal on the 2 sides and making the slope all on
the back side to bring them to the shape above described. leaving
the front side straight. ^the other ends sloped in the same manner to a suitable [illegible] still leaving the front side straight^ one full row of 17 Spikes is placed near
the lower edge of the lower concave piece an equal distance apart.
another half row is placed near the upper edge of the same piece
the Spikes in the half row are placed exactly above the alternate
spikes in the lower row 2 half [illegible] rows like the one just described
are placed in the upper piece. the spikes in each row placed so
as to stand above the spaces in the row next below. both pieces
of the Concave are covered with Sheet Iron. An apron extends from
the lower part of the concave in a horizontal direction to the front
end of the ^sides girts. and rests on a board which fills the space between
the above apron and the cross girt below and answers for a brace
to the frame. The lower end of the feed Apron joins the upper
edge of the concave. and rests on a small tie framed into the
top of the side girts near the back and an inch board is placed
on the front end of the side girts and fills the space between
the front cap and the end of the side girts and prevents the grain from rising too high as it passes out of the Machine. Semicircular pieces are placed on the side girts between the posts and cut to a circle of 10 ins radius from the centre of the Cylinder. That part of this circle between the caps is covered with sheet Iron which forms a cap over the Cylinder. The Cylinder Shaft is made of 1 & 1/2 in square bar iron 3 feet 4 ins long with 2 journals 30 ins apart and 6 ins to project on the outside of the journal at one end to receive the pulley. The journals each 2 ins long and 1 & 1/4 ins diameter. These journals run in boxes of cast iron or some other suitable material placed in the top of the side girts in the centre between the front and back posts. on this shaft and between the journals are placed 3 heads. 13 ins diameter and 1 & 1/2 ins thick one in the centre and one at each end near the journals the heads are put on the shaft with cast iron centres made with flanges which are rivetted to the head. on the surface of the heads and lengthwise of the cylinder are placed six pieces of lagging 24 & 1/2 ins long. the width of the surface of each piece is 1/12 part of the circumferance of the heads they are 2 in, thick and let the whole thickness into the heads. in each piece of lagging there are 10 spikes in a half row so that each 2 pieces constitutes a whole row. the spikes in one row following the spaces in the other so as to fill all the spaces in the lower row of the concave. That part of the Cylinder Spikes which extend beyond the surface of the lagging are the same length and shape of the Spikes in the concave. the sloped side of the spikes are set to run foremost as the Cylinder revolves. the other end is 2 & 1/2 inches long made tapering with a screw cut on the end to receive a burr. the spikes are put through the lagging and the burr screwed on the in-side to prevent the spike from being thrown out by centrifugal force and to make it convenient to replace spikes which may be injured or broken by accident. the lagging is covered with Sheet Iron. the ends of the cylinder are secured with sufficient bands. the middle of the lagging secured to the head by screw
bolts passing through the centre of the Cylinder.
Improvements claimed. We claim as our improvement the pecu-
liar construction of the frame of this machine which is cheap.
convenient and durable also the form of the Cylinder with 6 pieces
of wood or lagging on the surface. and the spikes passing through
them with screws and burrs on the inside. the spikes are straight
in one side and sloped on the other three. the side most sloped
is placed so as to act on the grain; the construction of the cylin-
der is such that while it possesses sufficient strength to be dura-
ble. it has no unnecessary weight and consequently requires
less power to propel it than most of those now in use. The
shape of the spikes is such that when they are set in the cylin
der. the points incline backwards which causes the straw to
leave the Cylinder as soon as it passes the concave and prevents
it from passing round and clogging the Cylinder. these spikes
being placed in wood are less liable to be broken or injured
than when placed in Iron - All the above improvements
we rely on together with the privilege to vary the proportions
and materials according to the Law Witnesses
William H. White
Ebenezer Coe.

Hugh Edgar
Isaac M. Edgar

[illegible]
H.J.W.